(12) United States Patent
Rattunde

(10) Patent No.: US 10,857,642 B2
(45) Date of Patent: Dec. 8, 2020

(54) CHIP EXTRACTION SYSTEM

(71) Applicant: Rattunde & Co GmbH, Ludwigslust (DE)

(72) Inventor: Ulrich Rattunde, Bentwisch (DE)

(73) Assignee: Rattunde AG, Ludwigslust (DE)

( * ) Notice: Subject to any disclaimer, the term of this patent is extended or adjusted under 35 U.S.C. 154(b) by 93 days.

(21) Appl. No.: 16/090,316

(22) PCT Filed: Mar. 22, 2017

(86) PCT No.: PCT/EP2017/056846
§ 371 (c)(1),
(2) Date: Oct. 1, 2018

(87) PCT Pub. No.: WO2017/167621
PCT Pub. Date: Oct. 5, 2017

(65) Prior Publication Data
US 2019/0111531 A1 Apr. 18, 2019

(30) Foreign Application Priority Data
Apr. 1, 2016 (DE) .................. 10 2016 105 978

(51) Int. Cl.
*B04C 5/187* (2006.01)
*B23Q 11/00* (2006.01)
*B04C 9/00* (2006.01)

(52) U.S. Cl.
CPC .......... *B23Q 11/0046* (2013.01); *B04C 5/187* (2013.01); *B04C 2009/002* (2013.01); *B04C 2009/007* (2013.01)

(58) Field of Classification Search
CPC . B23Q 11/046; B04C 5/187; B04C 2009/007; B04C 5/185
See application file for complete search history.

(56) References Cited

U.S. PATENT DOCUMENTS 4,080,182 A * 3/1978 Vitovec .................... B01D 7/02
96/296
4,729,772 A * 3/1988 Asanuma ................ B04C 5/185
95/1

(Continued)

FOREIGN PATENT DOCUMENTS

DE    32 39 542    4/1984
DE    40 27 583    3/1992

(Continued)

OTHER PUBLICATIONS

International Search Report, European Patent Office, dated May 15, 2017.

*Primary Examiner* — Patrick H Mackey
(74) *Attorney, Agent, or Firm* — Bay State IP, LLC

(57) ABSTRACT

The invention relates to a chip extraction system for the continuous disposal of chips, comprising a chip extracting tube (9), which opens out into a vacuum chamber (2) with a base on which chips (12) that are sucked in collect, a chip discharging tube (17), which has an inlet (16) arranged on the base and an outlet (18) arranged outside the vacuum chamber (2), wherein an inner cross-sectional area of the chip discharging tube (17) increases between the inlet (16) and the outlet (18), and at least one chip forcing device (14, 19), which is arranged at the inlet (16) and forces the chips (12) that have collected on the base into the inlet (16).

9 Claims, 2 Drawing Sheets

(56) References Cited

U.S. PATENT DOCUMENTS

Figure 1:
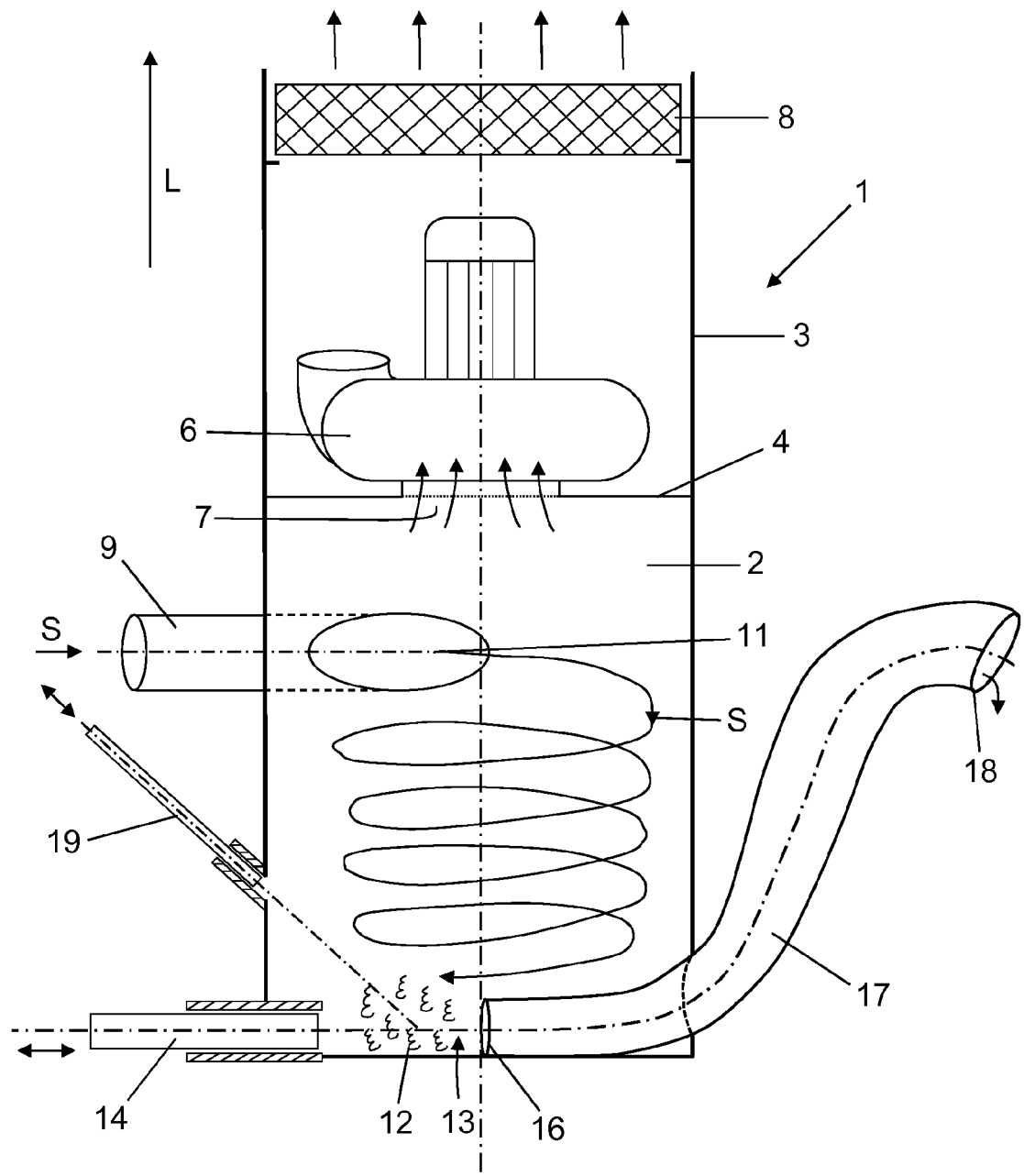

| | | | | |
|---|---|---|---|---|
| 7,410,527 B2* | 8/2008 | Wagner | ................. | B01D 45/12 |
| | | | | 55/424 |
| 2005/0242007 A1 | 11/2005 | Simpson | | |
| 2014/0255133 A1* | 9/2014 | Wilkinson | ............ | B01J 8/0025 |
| | | | | 414/291 |

FOREIGN PATENT DOCUMENTS

| | | |
|---|---|---|
| DE | 103 21 438 A1 | 12/2004 |
| DE | 10 2013 207 928 | 10/2014 |
| JP | S59 26438 U | 2/1984 |
| JP | 11226839 A | 8/1999 |
| JP | 2 964388 B2 | 10/1999 |

\* cited by examiner

CHIP EXTRACTION SYSTEM

CROSS REFERENCE TO RELATED APPLICATION

This application is for entry into the U.S. National Phase under § 371 for International Application No. PCT/EP2017/056846 having an international filing date of Mar. 22, 2017, and from which priority is claimed under all applicable sections of Title 35 of the United States Code including, but not limited to, Sections 120, 363, and 365(c), and which in turn claims priority under 35 USC 119 to German Patent Application No. 10 2016 105 978.1 filed on Apr. 1, 2016.

The invention relates to a chip extraction system for continuous disposal of chips. The invention also relates to a method for extracting chips.

During processing of materials, in particular tubes and metal tubes, chips accumulate in various working steps. Metal chips are produced, for example, during sawing of the tubes, but likewise chips are produced during chamfering. Furthermore, chips can also be produced during sawing of plastic parts, in particular plastic tubes. The same also applies for the sawing of wooden parts. Extraction systems are usually provided at different positions of the processing machines, and extract the chips accumulating during respective processing steps.

A sawing device, which has a sawing unit and an extraction unit for extracting sawing waste accumulating during operation of the sawing unit, is known from DE 10 2013 207 928 A1. Moreover, the extraction unit comprises a compression unit for compressing the sawing waste extracted by means of the extraction unit.

A briquetting press for biomaterials and waste products is known from DE 32 39 542 A1, in which a pressing tool is connected downstream of a plunger pressing channel, said pressing tool being divided longitudinally into tube parts, wherein the tube parts can be actuated radially by means of pressing devices.

In DE 40 27 583 A1 a device for pressing extruded parts is described, in which a stepped filling and pressing chamber is provided.

There are different extraction systems in the prior art. For example the extracted stream can be guided through a filter in which the chips are collected. The filter must be replaced from time to time. For this purpose the machine is switched off, the polluted filter is removed and replaced by a clean filter.

It is also known to collect chips in a container until the container is full. Since the chips are usually extracted by the generation of a vacuum, the container cannot, however, be readily replaced in the vacuum chamber, but the machine or the extraction system must be switched off, the container must be removed from the vacuum chamber and replaced by an empty container.

In the known extraction systems the fundamental problem arises that a suction effect is produced by the generation of a vacuum and the sawing chips are then sucked into the region of the vacuum. They are generally collected there, and for removal of the chips from the vacuum region the extraction system must be switched off, since in the event of removal during operation the vacuum would break down.

Therefore an object of the present invention is to provide an extraction system for chips by which the chips can be continuously disposed of during the operation of the extraction system. It is also an object of the present invention to provide a method for extracting chips in which the chips can be continuously disposed of during the operation of the system.

The object is achieved in its first aspect by a chip extraction system with the features of claim 1.

The chip extraction system according to the invention continuously sucks chips out of a working region of a work machine, in particular a tube cutting machine, tube sawing machine or processing stations arranged upstream and downstream of the tube sawing machine. The chip extraction system according to the invention is intended in particular for extracting metal chips, but also plastic chips. In the case of preferred metal profiles, such as metal tubes, metal chips accumulate in particular. However, the chip extraction system is suitable for extracting plastic or wood chips. The extracted chips are in particular preferably metallic crumbling chips, spiral chips, helical chips, thread chips or ribbon chips. The chip shapes can occur individually; however, it is also conceivable that the different chip shapes occur together or in various groupings. These are chips which can become entangled with one another and in particular in the case of metal chips they can form a large agglomeration of chips, which, although it is movable per se, is nevertheless difficult to manipulate and can only lower be deformed sometimes with considerable application of force.

The invention also comprises a tube cutting machine with the chip extraction system according to the invention, in particular for metal chips.

The chip extraction system according to the invention comprises a chip extraction tube which has an inlet in the region of the accumulation of chips, the working region, and opens out into a vacuum chamber which is connected to the chip extraction tube so as to conduct air and, due to the vacuum, sucks air through the chip extraction tube, and thereby the chips accumulating in the working region are sucked into the vacuum chamber by the developing air stream.

In the vacuum chamber a vacuum can be built up in different ways. However, it is provided that the chips which are sucked in fall to a base, i.e. towards the ground, and collect on the base of the vacuum chamber. In particular, therefore, an air stream forming in the vacuum chamber for generating the vacuum should not be so great that the chips which are sucked in are entrained by it against the force of gravity.

The chip extraction system comprises a chip discharging tube, which has an inlet arranged on the base of the vacuum chamber and an outlet arranged outside the vacuum chamber, wherein an inner cross-sectional area of the chip discharging tube increases between the inlet and the outlet.

At least one chip forcing device is provided which is arranged at the inlet and forces the chips that have collected on the base into the inlet.

Both the chip forcing device and also the chip discharging tube can be designed in different ways. However, in any case it is provided that the chip discharging tube has at least along a portion, preferably over the entire length of its extent, a free inner cross-sectional area which increases from the inlet towards the outlet.

The chip discharging tube can be configured cross-sectionally, in some portions or over its entire longitudinal extent, in a circular shape, so that in this case a radius or diameter of the chip discharging tube constantly enlarges in some portions or along the entire extent of the chip discharging tube. Due to the enlargement of the inner cross-sectional area of the chip discharging tube, the chips forced by the chip forcing device into the chip discharging tube are prevented from sliding or falling out of the inlet again, although the inlet is connected to the vacuum chamber so as to conduct air and there is also a vacuum at the inlet of the chip discharging tube. However, the vacuum is not so great that a sausage-shaped agglomeration of chips, which is forced into the chip discharging tube and widens towards the outlet, could be sucked back by the vacuum. The chip agglomeration is not deformable enough for that.

It is preferably provided that the chip discharging tube is composed of tube sections each having a constant cross-sectional area and the discrete cross-sectional areas increase in stages from the inlet towards the outlet. However, it is also conceivable that the chip discharging tube has an inner cross-sectional area which enlarges conically, i.e. continuously. As a result a cone of chips is produced in the chip discharging tube and can only be conveyed out of the discharging tube in the direction of the outlet. The device is suitable in particular for transporting metal chips, but also plastic chips. In particular, however, in the case of the preferred metal chips it is provided that, due to the forcing in by means of the chip forcing device, the chips jam in the chip discharging tube and are adapted in their conical shape to the chip discharging tube and are more or less stuck in the chip discharging tube like a plug. The chip discharging tube can have a length of a metre and a diameter at the inlet of 100 mm and at the outlet of 150 mm. However, other dimensions are also conceivable.

Due to forcing in of the chips into the chip discharging tube a free inner cross-sectional area of the chip discharging tube is reduced, so that in particular an air stream from the outlet in the direction of the inlet, that is to say against the transport direction of the chips, is reduced and almost completely prevented, so that the vacuum forming in the vacuum chamber can be kept stable, although chips are continuously transported away from the inlet towards the outlet.

In a particularly preferred embodiment of the chip extraction system, on the base a depression is provided in which the chip forcing device acts and on which the inlet of the chip discharging tube is arranged. It is preferably provided that the outlet of the chip extraction tube is arranged tangentially on an outer wall of the vacuum chamber, so that the chips extracted through the chip discharging tube rotate spirally in the vacuum chamber and collect in a rotational movement in the centre of the base of the vacuum chamber. A depression is provided in the region of the centre of the base of the vacuum chamber. Due to their rotational movement the chips already collect preferably in the centre of the base and thus in the depression. However, there they are additionally forced by the chip forcing device into the inlet which is likewise arranged in the depression. The depression can be recessed in the base, and both the chip forcing device and also the inlet of the chip discharging tube can be provided below the base.

In a preferred embodiment of the invention the chip forcing device has a pump cylinder which acts horizontally in the depression and forces the chips collected in the depression into the inlet. The pump cylinder is preferably driven pneumatically.

The chip forcing device can have a plugging cylinder which is arranged diagonally above the depression and forces the chips into the depression.

The pump cylinder and the plugging cylinder preferably co-operate with one another in such a way that the plugging cylinder first of all presses the chips into the depression and the easily compressed chips are then forced by means of the pump cylinder into the inlet of the chip discharging tube.

The cycle of the plugging cylinder and that of the pump cylinder are staggered with respect to one another. However, a stroke movement of the plugging cylinder and a stroke movement of the pump cylinder co-operate in a common working cycle. These working cycles can be carried out just after one another or can also be carried out successively at time intervals of several seconds.

In a particularly preferred embodiment of the invention the pump cylinder has individual pump cylinders or tubes which are inserted telescopically into one another and advantageously can be controlled separately.

The pump cylinder has a piston which is movable horizontally in the direction of the inlet and has an external diameter which is smaller than an internal diameter of the inlet, so that the piston of the pump cylinder can be pushed into the inlet of the chip discharging tube. It can preferably be pushed into the chip discharging tube by several centimetres, i.e. up to 10 cm or 15 cm or any amount between these two distances, and thus can force the chips deep into the chip discharging tube.

In order to prevent jamming of the pump cylinder inside the inlet, a relatively large gap is provided between the outer wall of the piston and the inner wall of the inlet. However, the gap preferably has different gap widths depending upon the chips which are to be removed. Otherwise, in particular in the case of very long spiral chips, the piston would jam due to chips becoming caught in the inlet. Therefore it is advantageously provided that the pump cylinder has a plurality of pump cylinders fitted telescopically inside one another, wherein the innermost pump cylinder has an actual cylindrical shape and the tube cylinders surrounding it actually have a tubular configuration. Due to this configuration of the pump cylinder the external diameter of the pump cylinder can be adapted to the requirements set by the chips.

In a second aspect, the object of the invention is achieved by a method with the features of claim 9. The method is suitable in particular to be carried out with one of the chip extraction systems described above.

The extraction method can also be part of a method for machining tube sections, in particular metal tube sections, by means of a tube cutting machine.

In the method according to the invention a vacuum is generated in a vacuum chamber, and as a result chips are sucked into the vacuum chamber through a chip extraction tube. In the vacuum chamber the chips which are sucked in fall towards the ground to the base of the vacuum chamber. The chips which have fallen down are forced by a chip forcing device into an inlet of a chip discharging tube arranged on the base, wherein an inner cross-sectional area of the chip discharging tube increases between the inlet and the outlet and the chips forced into the chip discharging tube are forced out of the outlet arranged outside the vacuum chamber.

With regard to the method it has also been shown, surprisingly, that without interruption of the extraction of the chips a continuous disposal of chips can take place without the extraction system being switched off, because the chips can be conveyed out of the vacuum chamber without the vacuum chamber having to be opened because during the removal the chips themselves close the chip discharge tube, at least 99% closed, as they are forced by the chip forcing device into the chip discharging tube. Furthermore, sucking back of the sausage-shaped agglomeration of chips or of the plug of chips into the chip discharging tube is counteracted in that the internal cross-section of the chip discharging tube is enlarged, so that the sausage-shaped agglomeration of chips is jammed firmly as it moves in the direction of the inlet.

The chips preferably collect in a depression on the base and are packed by means of a plugging cylinder into the depression and then are packed by means of a pump cylinder out of the depression into the inlet.

The lengths and diameters of the chip discharging tube are dimensioned so that when the chip discharging tube is completely full and completely packed a passage of air from the outlet in the direction of the inlet is still possible only to a very limited extent, so that the vacuum in the vacuum chamber is maintained. In the vacuum chamber an extraction fan is advantageously provided above the chip discharging tube, and by this fan air is blown out of the vacuum chamber through a filter to the outside and as a result a vacuum is generated.

Figure 2:
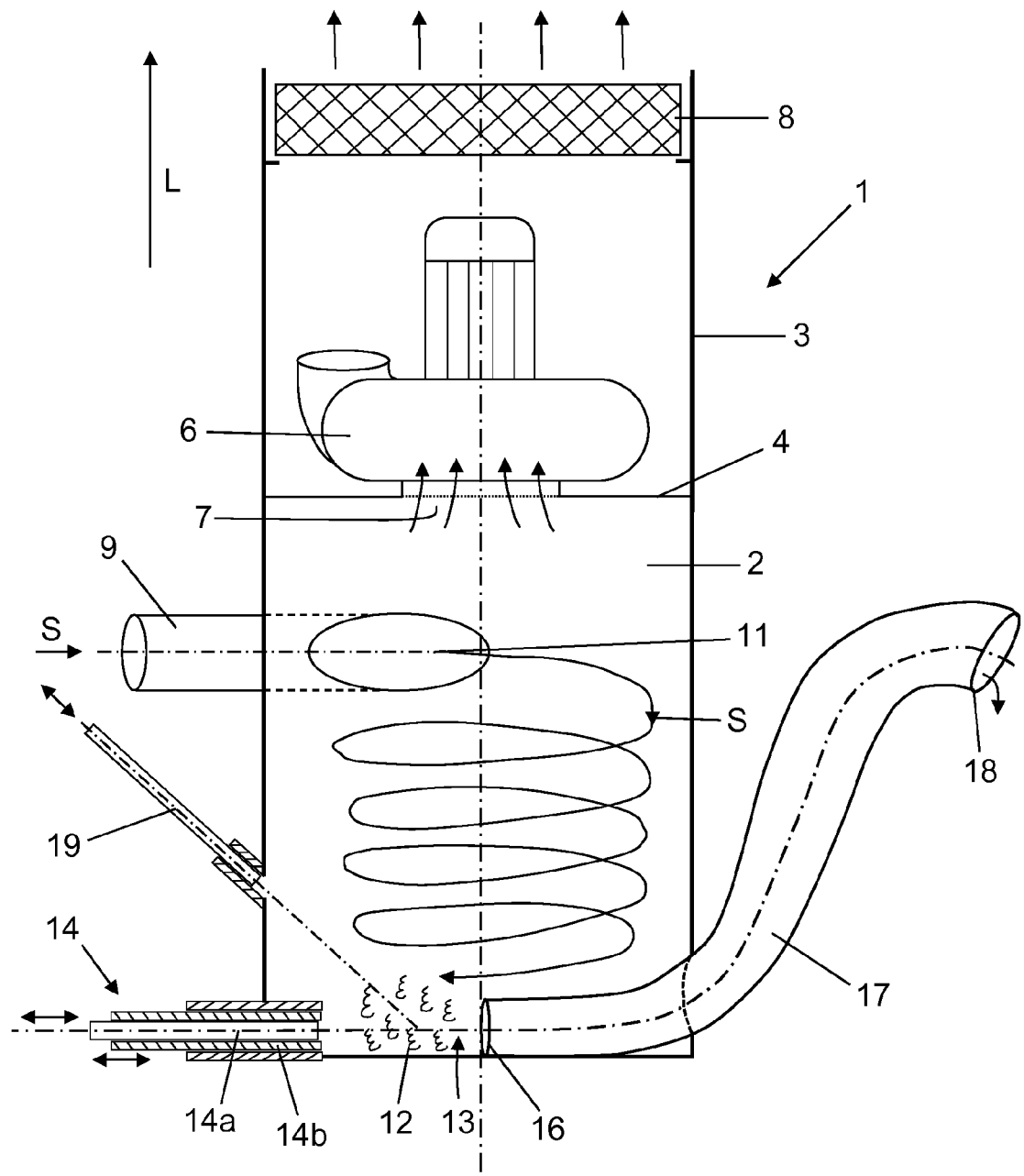

The invention is described with reference to two embodiments in two drawings. In the drawings:

FIG. 1 shows a first embodiment of the chip extraction system according to the invention, FIG. 2 shows a second embodiment of the chip extraction system according to the invention.

In FIG. 1 a chip extraction system 1 with a vacuum chamber 2 is shown, which is part of a housing cylinder 3 in the interior of which an intermediate base 4 is introduced. An extraction fan 6, which extracts air from the vacuum chamber 2 upwards through an opening 7 in the intermediate base 4 and blows it out through a filter 8, is arranged centrally in the intermediate base 4. A vacuum is generated in the vacuum chamber 2 by the extraction of the air. This vacuum produces an air stream S through a chip extraction tube 9 arranged tangentially on the vacuum chamber 2. The chip extraction tube 9 has an inlet (not shown) which is located in the region of the chip production, and an elliptical mouth 11 in the wall of the vacuum chamber 2. Due to the air stream S through the chip extraction tube 9 a rotating air stream S is generated in the interior of the vacuum chamber 2 and transports the extracted chips 12. Because of the weight force the chips 12 fall in a rotational movement towards the base of the vacuum chamber 2. In the base of the vacuum chamber a depression 13 is provided, which is arranged approximately centrally in the base of the vacuum chamber 2. The vacuum chamber 2 is formed with a circular shape in a cross-section perpendicular to a longitudinal direction L.

The depression 13 can be approximately rectangular in plan view. A pump cylinder 14 on the one hand and an inlet 16 of a chip discharging tube 17 on the other hand are provided below the depression 13. The chips 12 collected in the depression 13 are pressed into the inlet 16 of the chip discharging tube 17 with the aid of the pump cylinder 14. The chip discharging tube 17 is approximately S-shaped. It widens conically, i.e. a circular inner cross-section increases continuously from the inlet 16 to an outlet 18. In this exemplary embodiment the length of the chip discharging tube 17 is approximately one metre. A diameter of the inlet 16 is 100 mm, and a diameter of the outlet 18 is 150 mm.

In addition a plugging cylinder 19 is provided which is arranged diagonally above the depression 13 and by which the chips 12 moving in rotation on the base are packed into the depression 13. From there they can then be packed into the inlet 16 by means of the pump cylinder 14. A controller (not shown) is provided which first of all controls the plugging cylinder 19 and thereafter controls the pump cylinder 14. The plugging cylinder 19 carries out a short to-and-fro movement, presses the chips 12 into the depression 13, and shortly thereafter the pump cylinder 14 carries out a to-and-fro movement and presses the chips 12 into the inlet 16. In this case the pump cylinder 14 can be pressed in by several centimetres, for example ten centimetres, into the inlet 16 of the chip discharging tube 17. The more the chip discharging tube 17 is filled with chips, the less permeable to air the chip discharging tube 17 is along its inner longitudinal extent. Because of the low air permeability of the filled chip discharging tube 17 it is possible that, in spite of the continuous removal of the chips 12 through the chip discharging tube 17, the extraction fan 6 maintains a vacuum in the vacuum chamber 2 and thus can continuously suck chips 12 out the working region (not shown). A box or the like, in which the emerging sausage-shaped agglomeration of chips is collected, can be arranged below the outlet 18 of the chip discharging tube 17.

At the start of the extraction process, if the chip discharging tube 17 is not yet full, first of all a lid which prevents the passage of air is placed on the outlet 18.

A second embodiment of the invention is illustrated in FIG. 2. This differs from the first embodiment only in the configuration of the pump cylinder 14. In FIG. 1 the pump cylinder 14 is configured as an integral cylindrical body, whilst the pump cylinder 14 in FIG. 2 is configured in multiple parts. The pump cylinder 14 has a plurality of individual pump cylinders or tubes 14a, 14b which are movable telescopically one inside the other. Therefore by corresponding control it is possible for the cross-section of the pump cylinder 14 actually carrying out the pumping movement to be adapted to the requirements, in particular the type of chips. A problem with packing the chips 12 into the inlet 16 is that the pump cylinder 14 can become jammed in the inlet 16 of the chip discharging tube 17. Therefore considerable gap widths of approximately 1 cm or even more are necessary. However, in the case of chips 12 which have a short length and are not very straight, gap widths of below 1 cm can be sufficient. These different requirements concerning the cross-section of the pump cylinder 14 can be taken into account by the corresponding provision of more or fewer individual pump cylinders or tubes 14a, 14b which are moved jointly or individually.

LIST OF REFERENCES 1 chip extraction system
2 vacuum chamber
3 housing cylinder
4 intermediate base
6 extraction fan
7 opening
8 filter
9 chip extraction tube
11 elliptical mouth
12 chips
13 depression
14 pump cylinder
14a individual pump cylinder
14b individual pump tube
16 inlet
17 chip discharging tube
18 outlet
19 plugging cylinder
L longitudinal direction
S air stream

The invention claimed is:
1. A chip extraction system for the continuous disposal of chips, comprising:

a chip extraction tube (9) which opens out into a vacuum chamber (2) with a base on which chips (12) that are sucked in collect;

a chip discharging tube (17), which has an inlet (16) arranged on the base and an outlet (18) arranged outside the vacuum chamber (2), wherein an inner cross-sectional area of the chip discharging tube (17) increases between the inlet (16) and the outlet (18);

at least one chip forcing device (14, 19), which is arranged at the inlet (16) and forces the chips (12) that have collected on the base into the inlet (16); and an extraction fan (6) arranged above the mouth of the chip extraction tube (9) and generates the vacuum in the vacuum chamber (2), the suction of this fan being such that the chips (12) which are sucked in fall to a base in the vacuum chamber (2).

2. The chip extraction system according to claim 1, wherein a depression (13) is provided on the base, in which the chip forcing device (14, 19) acts and on which the inlet (16) of the chip discharging tube (17) is arranged.

3. The chip extraction system according to claim 1, wherein the chip discharging tube (17) is composed of tube sections each having a cross-sectional area and the cross-sectional areas increase in stages from the inlet (16) towards the outlet (18).

4. The chip extraction system according to claim 1, wherein the chip forcing device has a pump cylinder (14) which acts horizontally in the depression (13) and forces the chips (12) collected in the depression (13) into the inlet (16).

5. The chip extraction system according to claim 1, wherein the chip forcing device has a plugging cylinder (19) which is arranged diagonally above the depression (13) and forces the chips (12) into the depression (13).

6. The chip extraction system according to claim 1, wherein a pump cylinder (14) has individual pump cylinders or tubes (14a, 14b) which are inserted telescopically into one another and are separately controllable.

7. The chip extraction system according to claim 1, wherein a plugging cylinder (19) and a pump cylinder (14) can be actuated successively.

8. A method for extracting chips (12), comprising the steps of:

generating a vacuum in a vacuum chamber (2);

sucking the chips through a chip extraction tube (9) into the vacuum chamber (2), wherein the chips (12) sucked in fall to a base in the vacuum chamber (2);

forcing the chips (12) which have fallen down by a chip forcing device (14, 19) into an inlet (16) of a chip discharging tube (17) arranged on the base;

wherein an inner cross-sectional area of the chip discharging tube (17) increases between the inlet (16) and an outlet (18), and the chips (12) forced into the chip discharging tube (17) are forced out of the outlet (18) arranged outside the vacuum chamber (2); and wherein the chips (12) collect in a depression (13) on the base and are packed by means of a plugging cylinder (19) into the depression (13) and then are packed by means of a pump cylinder (14) out of the depression (13) into the inlet (16).

9. The method for extracting chips according to claim 8, wherein the chips (12) are compressed in the chip discharging tube (17) to such an extent that they close a free inner cross-sectional area of the chip discharging tube (17) to such an extent that the vacuum in the vacuum chamber is maintained.

* * * * *